US008596481B2

(12) United States Patent
Lee

(10) Patent No.: US 8,596,481 B2
(45) Date of Patent: Dec. 3, 2013

(54) CLUTCH OIL RESERVOIR CAP

(75) Inventor: Haksung Lee, Iksan (KR)

(73) Assignee: Hyundai Motor Company, Seoul (KR)

( * ) Notice: Subject to any disclaimer, the term of this patent is extended or adjusted under 35 U.S.C. 154(b) by 1064 days.

(21) Appl. No.: 12/252,901

(22) Filed: Oct. 16, 2008

(65) Prior Publication Data

US 2009/0045199 A1 Feb. 19, 2009

(51) Int. Cl.
- *B65D 51/16* (2006.01)
- *F16K 15/00* (2006.01)
- *F16K 17/00* (2006.01)
- *F16K 21/04* (2006.01)

(52) U.S. Cl.
USPC ........... 220/203.26; 220/203.19; 220/203.23; 220/203.24; 220/203.28; 220/303; 137/540

(58) Field of Classification Search
USPC ............. 220/203.19, 203.23, 203.24, 203.26, 220/203.28, 303; 137/540
See application file for complete search history.

(56) References Cited

U.S. PATENT DOCUMENTS

| 6,158,606 A * | 12/2000 | Oliver ...................... 220/203.04 |
| 6,349,842 B1 * | 2/2002 | Reutter .......................... 220/201 |
| 6,390,318 B1 * | 5/2002 | Tanaka et al. ............ 220/203.26 |

FOREIGN PATENT DOCUMENTS

| JP | 55-19623 A | 2/1980 |
| JP | 56-168658 U | 12/1981 |
| JP | 59-11058 | 1/1984 |
| JP | 63-101302 U | 7/1988 |
| JP | 05-65753 U | 8/1993 |
| KR | 1999-0037730 U | 10/1999 |
| KR | 2003-0037670 A | 5/2003 |
| KR | 10-0471890 B1 | 3/2005 |

* cited by examiner

*Primary Examiner* — Anthony Stashick
*Assistant Examiner* — Andrew T Kirsch
(74) *Attorney, Agent, or Firm* — Morgan, Lewis & Bockius LLP

(57) ABSTRACT

A clutch oil reservoir cap according to an exemplary embodiment of the present invention including a head and a body may include an exhaust opening formed in the head for exhausting air, an intake hole formed in the head for inflow of air, and an operation valve disposed in the head, wherein the operation valve selectively opens or closes the exhaust opening and the intake hole according to fluctuation of pressure in a part below the operation valve.

16 Claims, 3 Drawing Sheets

CLUTCH OIL RESERVOIR CAP

CROSS-REFERENCE TO RELATED APPLICATION

This application claims priority to and the benefit of Korean Patent Application No. 10-2007-0082657, filed in the Korean Intellectual Property Office on Aug. 17, 2007, the entire contents of which are incorporated herein by reference.

BACKGROUND OF THE INVENTION (a) Field of the Invention

The present invention relates to a clutch oil reservoir cap. More particularly, the present invention relates to a clutch oil reservoir cap that includes an operation valve and where pressure in the reservoir cap can be balanced with atmospheric pressure.

(b) Description of the Related Art

Generally, driving torque for a vehicle is generated by an engine and transmitted to the wheels through a shifting operation.

The shifting operation is for using power efficiently and a clutch is used in the shifting operation.

The clutch is operated by a hydraulic pump and a clutch oil reservoir is disposed for supplying oil to the hydraulic pump.

Pressure in the oil reservoir must be balanced with atmospheric pressure for supplying oil reliably.

Pressure in the oil reservoir can change according to temperature differences in summer and winter, or a volume change according to abrasion of a clutch disk can make a change of pressure in the oil reservoir.

It has been considered to make a hole for dealing with the pressure changes, however, the hole can become blocked by the clutch oil or the clutch oil can leak out through the hole.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention has been made in an effort to provide a clutch oil reservoir cap that includes an exhaust opening, an intake hole, and an operation valve selectively opening or closing the exhaust opening and the intake hole for balancing pressure in the clutch oil reservoir cap and atmospheric pressure.

The clutch oil reservoir cap according to an exemplary embodiment of the present invention may prevent the exhaust opening and intake hole from becoming blocked or leaking oil.

The clutch oil reservoir cap according to an exemplary embodiment of the present invention may include a head and a body, comprising: an operation valve slidably mounted in the head and forming a first space and a second space therebetween; an intake hole formed in the head and the operation valve and selectively communicating the first space and the second space; and an exhaust opening formed in the head and exhausting air of the second space to the outside of the head; wherein the operation valve selectively opens or closes the exhaust opening and the intake hole according to a pressure difference between the first space and the second space in the body. An elastic member may be disposed in the head for supplying a restoring force to the operation valve, wherein an upper elastic member may disposed in the first space and a lower elastic member may disposed in the second space for supplying a restoring force to the operation valve respectively according to the pressure difference.

In an aspect, the first space may be formed between the head and upper surface of the operation valve and, the second space may be formed between the head and lower surface of the operation valve, and the intake hole includes: a first hole formed at a portion of the head and communicating the first space and an outside of the clutch oil reservoir cap; a second hole formed in a side of the head and connected to the first space; and a third hole formed in the operation valve and connected to the second space, wherein the second hole and the third hole are selectively communicated according to the pressure difference in the first space and the second space for balancing the pressure therebetween. The operation valve may include a first protrusion portion that is upwardly protruded in the operation valve and the third hole is formed therein. The exhaust opening may be formed at a junction of the head and the body.

In another aspect, the operation valve may include a second protrusion portion that is downwardly protruded in the operation valve and selectively closes or opens the exhaust opening according to the pressure difference in the first space and the second space. A blocking portion and a sealing rubber may be disposed in the body for preventing leakage of oil. The exhaust opening may be formed at a junction of the head and the body. The operation valve may include a second protrusion portion that is downwardly protruded in the operation valve and selectively closes or opens the exhaust opening according to the pressure difference in the first space and the second space.

In further another aspect, a third protrusion portion may be formed below the operation valve for supporting the elastic member and includes a guide hole thereof. The first space may be formed between the operation valve and the head, the second space is formed between the third protrusion portion and the operation valve, and the intake hole includes: a first hole formed at a portion of the head and communicating the first space and an outside of the clutch oil reservoir cap; a second hole formed in a side of the head and connected to the first space; and a third hole formed in the operation valve and connected to the second space, wherein the second hole and the third hole are selectively communicated according to the pressure difference in the first space and the second space for balancing the pressure therebetween. The operation valve may include a first protrusion portion that is upwardly protruded in the operation valve and the third hole is formed in the first protrusion portion. The exhaust opening may be formed at a junction of the head and the body, and a second protrusion portion is downwardly protruded in the operation valve and selectively closes or opens the exhaust opening through the guide hole according to pressure difference in the first space and the second space.

In another exemplary embodiment of the present invention, a clutch oil reservoir cap including a head and a body, may comprise: an operation valve slidably mounted in the head and forming a first space and a second space therebetween, wherein the second space is connected to an inside of the clutch oil reservoir tank; a first hole formed at a portion of the head and fluidly communicating the first space and an outside of the head; a second hole formed in the head and fluidly communicating with the first space; a third hole formed in the operation valve fluidly communicating with the second space; an exhaust opening selectively connected to the second space and exhausting air of the second space to the outside of the head; wherein the second hole and the third hole are disconnected and the exhaust opening is closed when pressure difference between the first space and the second space is substantially equal to zero; the second hole and the third hole is disconnected and the exhaust opening is open when pressure in the first space is lower than pressure in the second space; and the second hole and the third hole are connected, the exhaust opening is closed, and the first hole and the second hole are connected when pressure in the first space is equal to or higher than pressure in the second space.

An upper elastic member may be disposed in the first space and a lower elastic member may be disposed in the second space for supplying a restoring force to the operation valve respectively according to the pressure difference. The operation valve may include: a first protrusion portion that is upwardly protruded in the operation valve and the third hole is formed in the first protrusion portion; a second protrusion portion is downwardly protruded in the operation valve and selectively closes or opens the exhaust opening, wherein the exhaust opening is formed at a junction of the head and the body; and a third protrusion portion is formed at the body below the operation valve for supporting the lower elastic member and includes a guide hole thereof, wherein a portion of the second protrusion portion selectively moves through the guide hole to open or close the exhaust opening according to pressure difference in the first space and the second space.

BRIEF DESCRIPTION OF THE DRAWINGS

FIG. 3 is a view showing an operation state of the clutch oil reservoir cap of FIG. 1 when air is flowed in.

REPRESENTATIVE REFERENCE NUMERALS

| 100: head | 110: first hole |
|---|---|
| 120: second hole | 130: exhaust opening |
| 140: first space | 200: body |
| 210: sealing rubber | 220: blocking portion |
| 230: connecting portion | 300: operation valve |
| 310: first protrusion portion | 320: second protrusion portion |
| 330: third hole | 340: second space |
| 400: third protrusion portion | 410: upper elastic member |
| 420: lower elastic member | 500: clutch oil reservoir tank |

DETAILED DESCRIPTION OF THE EMBODIMENTS

An exemplary embodiment of the present invention will hereinafter be described in detail with reference to the accompanying drawings.

Figure 1:
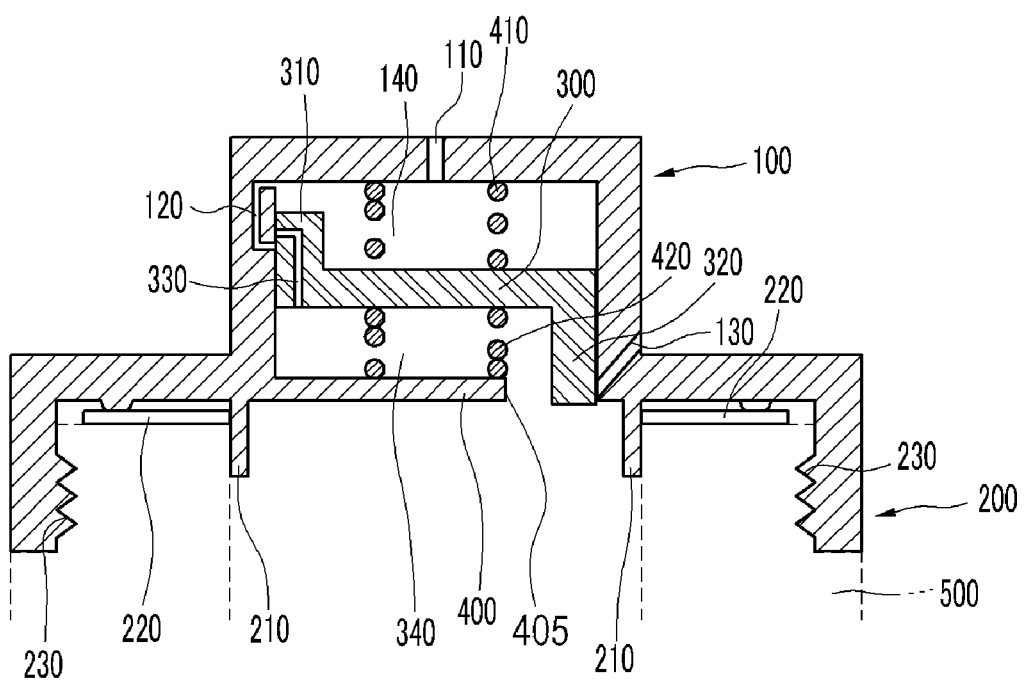
FIG. 1 is a schematic cross-sectional view showing a clutch oil reservoir cap according to an exemplary embodiment of the present invention.
Figure 2:
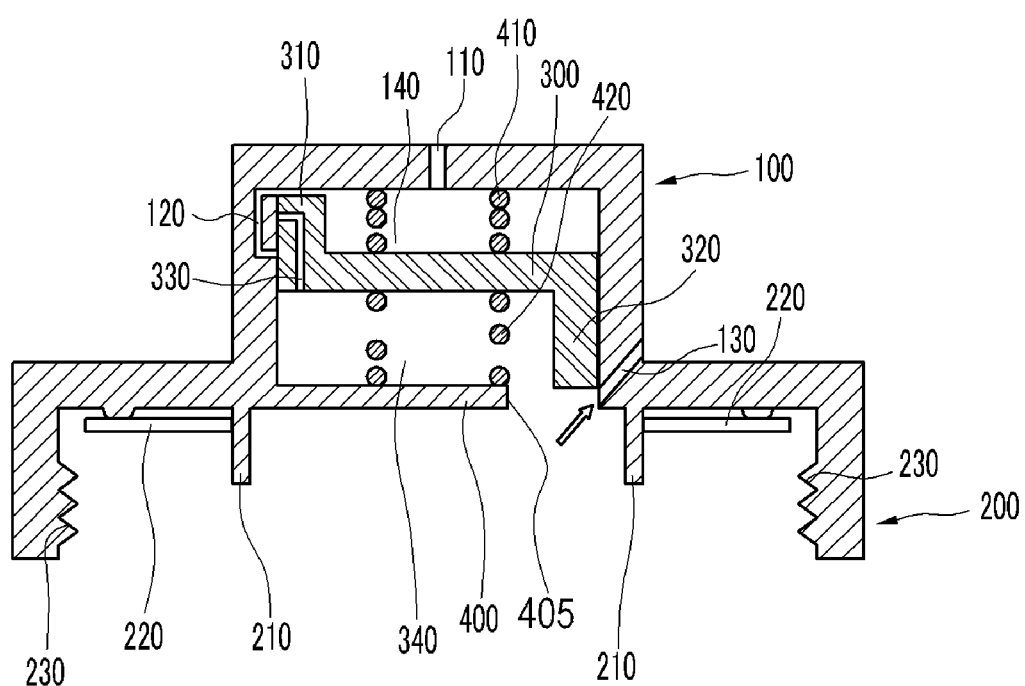
FIG. 2 is a view showing an operation state of the clutch oil reservoir cap of FIG. 1 when air is exhausted.
Figure 3:
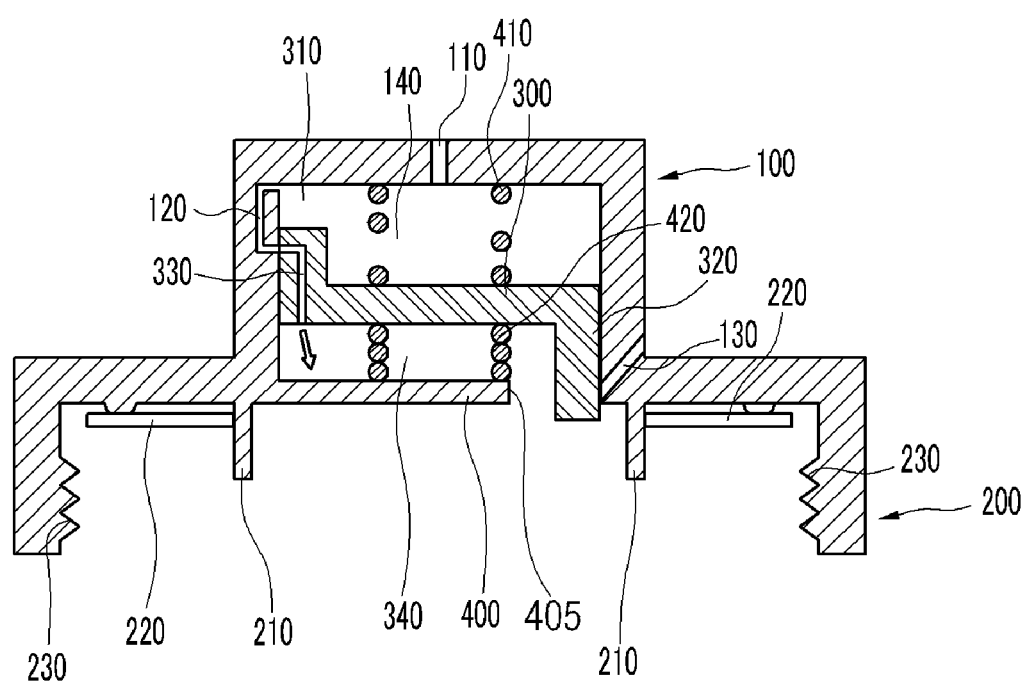

FIG. 1 is a schematic cross-sectional view showing a clutch oil reservoir cap according to an exemplary embodiment of the present invention, and FIG. 2 and FIG. 3 are views showing operation states of the clutch oil reservoir cap of FIG. 1 when air is exhausted and when air is flowed in, respectively.

A head 100 and a body 200 of a clutch oil reservoir cap 10 are shown in FIG. 1 wherein the head 100 is integrally positioned above the body 200.

An exhaust opening 130 is formed in a lower portion of the head 100 for selectively exhausting air.

An intake hole is formed in the head 100 for receiving air.

An operation valve 300 is slidably disposed in the head 100 for opening or closing the exhaust opening 130 and the intake hole.

A first space 140 is formed between the operation valve 300 and the upper portion of the head 100 and a second space 340 is formed between the operation valve 300 and the lower portion of the head 100.

The intake hole includes a first hole 110 formed at upper portion of the head 100 for communicating the first space 140 and an outside of the clutch oil reservoir cap, a second hole 120 formed in a lateral side of the head 100 wherein the second hole 120 fluidly communicates with the first space, and a third hole 330 formed in a lateral side of the operation valve 300.

The operation valve 300 includes a first protrusion portion 310 that is upwardly protruded in a lateral side of the operation valve 300 with a predetermined length and the third hole 330 is formed in the first protrusion portion 310 wherein the third hole 33 fluidly communicates with the second space 340.

A second protrusion portion 320 is downwardly protruded from a lateral side of the operation valve 300 with a predetermined length.

A third protrusion portion 400 extends inwards from inner portion of the body 200, and the second space 340 is formed between the operation valve 300 and the third protrusion portion 400. A guide hole 405 is formed between the third protrusion portion 400 and the body 200 so that a lower portion of the second protrusion portion 320 is commutable therethrough as explained later.

In an exemplary embodiment of the present invention, the above-set forth exhaust opening 130 is formed at the guide hole 405 and extends outwardly as shown in FIG. 1 so as to be selectively closed according to the movement of the operation valve 300.

An upper elastic member 410 and a lower elastic member 420 are disposed in the first space 140 and the second space 340 respectively in the head 100 for supplying a restoring force to the operation valve 300.

A connecting portion 230 for connecting the clutch oil reservoir cap 10 and a clutch oil reservoir tank 500 is formed in a lower portion of the body 200, and a blocking portion 220 and a sealing rubber 210 are disposed in the body 200 for preventing leakage of oil.

Hereinafter, an operation of the clutch oil reservoir cap will be explained.

FIG. 1 is a view showing the clutch oil reservoir cap according to an exemplary embodiment of the present invention in which pressure is balanced with atmospheric pressure.

When a pressure in the oil reservoir tank is balanced with atmospheric pressure, the third hole 330 formed in the first protrusion portion 310 and the second hole 120 formed in the head 100 are not fluidly communicated. Also, the exhaust opening 130 is blocked by the second protrusion portion 320.

Referring to FIG. 2, when pressure in the clutch oil reservoir tank is increased by increased temperature, or so on, the operation valve 300 moves upward in closing state of the second hole 120 and the third hole 330 by the restoring force of the lower elastic member 420 and the increased pressure in the clutch oil reservoir tank and the exhaust opening 130 is opened. When a pressure in the clutch oil tank is released through the exhaust opening 130, the operation valve 300 moves downward by the restoring force of the upper elastic member 410 until the pressure in the clutch oil reservoir tank 500 and maintains a balanced state, as shown in FIG. 1.

When pressure in the clutch oil reservoir tank 500 is decreased by a decrease in temperature, or so on, the operation valve 300 slidably moves downward by the restoring force of the upper elastic member 410, as shown in FIG. 3. Thus the second hole 120 and third hole 130 are communicated each other and air flows into the clutch oil reservoir tank but the exhaust opening 130 is closed by the second protrusion portion 320. The air flows into the clutch oil reservoir tank via the first space 140 and the second space 340. The pressure in the clutch oil tank 500 is not changed quickly due to the narrow holes of the second hole 120 and the third hole 330, and thereby noise and vibration can be prevented. A contaminated material in the atmosphere can be blocked in the first space 140. The second space 340 may prevent the clutch oil from flowing backward and leaking out.

When the pressure in the clutch oil reservoir tank 500 is balanced with the atmospheric pressure, the operation valve 300 moves upward by the restoring force of the lower elastic member 420 and maintains a balanced state, as shown in FIG. 1.

Elastic members may be both the upper elastic member 410 and the lower elastic member 420, or in an exemplary embodiment, one of the upper elastic member 410 and the lower elastic member 420 may be disposed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clutch oil reservoir cap including a head and a body, comprising:
    an operation valve slidably mounted in the head and forming a first space and a second space, wherein the first space is formed between the head and an upper surface of the operation valve and the second space is formed between the head and a lower surface of the operation valve;
    an intake hole formed in the head and the operation valve, wherein the intake hole comprises (i) a first hole formed at a portion of the head and communicating the first space and an outside of the clutch oil reservoir cap, (ii) a second hole formed in a side of the head and connected to the first space, and (iii) a third hole formed in the operation valve and connected to the second space, wherein the second hole and the third hole are selectively communicated according to the pressure difference in the first space and the second space for balancing the pressure therebetween; and
    an exhaust opening formed in the head and exhausting air of the second space to the outside of the head;
    wherein the operation valve selectively opens or closes the exhaust opening and the intake hole according to a pressure difference between the first space and the second space,
    wherein the operation valve includes a first protrusion portion that is upwardly protruded in the operation valve and the third hole is formed therein.

2. The clutch oil reservoir cap of claim 1, wherein an elastic member is disposed in the head for supplying a restoring force to the operation valve.

3. The clutch oil reservoir cap of claim 2, wherein an upper elastic member is disposed in the first space and a lower elastic member is disposed in the second space for supplying a restoring force to the operation valve respectively according to the pressure difference.

4. The clutch oil reservoir cap of claim 1, wherein the exhaust opening is formed at a junction of the head and the body.

5. The clutch oil reservoir cap of claim 1, wherein the operation valve includes a second protrusion portion that is downwardly protruded in the operation valve and selectively closes or opens the exhaust opening according to the pressure difference in the first space and the second space.

6. The clutch oil reservoir cap of claim 5, wherein a blocking portion and a sealing rubber are disposed in the body for preventing leakage of oil.

7. The clutch oil reservoir cap of claim 1, wherein the exhaust opening is formed at a junction of the head and the body.

8. The clutch oil reservoir cap of claim 7, wherein the operation valve includes a second protrusion portion that is downwardly protruded in the operation valve and selectively closes or opens the exhaust opening according to the pressure difference in the first space and the second space.

9. The clutch oil reservoir cap of claim 8, wherein a blocking portion and a sealing rubber are disposed in the body for preventing leakage of oil.

10. The clutch oil reservoir cap of claim 2, wherein a third protrusion portion is formed below the operation valve for supporting the elastic member and includes a guide hole thereof.

11. The clutch oil reservoir cap of claim 10, wherein the first space is formed between the operation valve and the head,
    the second space is formed between the third protrusion portion and the operation valve,
    and the intake hole includes:
    a first hole formed at a portion of the head and communicating the first space and an outside of the clutch oil reservoir cap;
    a second hole formed in a side of the head and connected to the first space; and
    a third hole formed in the operation valve and connected to the second space,
    wherein the second hole and the third hole are selectively communicated according to the pressure difference in the first space and the second space for balancing the pressure therebetween.

12. The clutch oil reservoir cap of claim 11, wherein the operation valve includes a first protrusion portion that is upwardly protruded in the operation valve and the third hole is formed in the first protrusion portion.

13. The clutch oil reservoir cap of claim 12, wherein the exhaust opening is formed at a junction of the head and the body, and a second protrusion portion is downwardly protruded in the operation valve and selectively closes or opens the exhaust opening through the guide hole according to pressure difference in the first space and the second space.

14. The clutch oil reservoir cap of claim 13, wherein a blocking portion and a sealing rubber are disposed in the body for preventing leakage of oil.

15. A clutch oil reservoir cap including a head and a body, comprising:
    an operation valve slidably mounted in the head and forming a first space and a second space therebetween, wherein the second space is connected to an inside of the clutch oil reservoir tank;
    a first hole formed at a portion of the head and fluidly communicating the first space and an outside of the head;
    a second hole formed in the head and fluidly communicating with the first space;

a third hole formed in the operation valve fluidly communicating with the second space; and an exhaust opening selectively connected to the second space and exhausting air of the second space to the outside of the head;

wherein the second hole and the third hole are disconnected and the exhaust opening is closed by the operation valve when pressure difference between the first space and the second space is substantially equal to zero;

the second hole and the third hole are disconnected and the exhaust opening is open by the operation valve when pressure in the first space is lower than pressure in the second space; and the second hole and the third hole are connected, the exhaust opening is closed, and the first hole and the second hole are connected by the operation valve when pressure in the first space is higher than pressure in the second space, wherein the operation valve includes:

a first protrusion portion that is upwardly protruded in the operation valve and the third hole is formed in the first protrusion portion, a second protrusion portion is downwardly protruded in the operation valve and selectively closes or opens the exhaust opening, wherein the exhaust opening is formed at a junction of the head and the body, and a third protrusion portion is formed at the body below the operation valve for supporting the lower elastic member and includes a guide hole thereof, wherein a portion of the second protrusion portion selectively moves through the guide hole to open or close the exhaust opening according to pressure difference in the first space and the second space.

16. The clutch oil reservoir cap of claim 15, wherein an upper elastic member is disposed in the first space and a lower elastic member is disposed in the second space for supplying a restoring force to the operation valve respectively according to the pressure difference.

* * * * *